United States Patent [19]

Kashiwame et al.

[11] Patent Number: 4,654,410
[45] Date of Patent: Mar. 31, 1987

[54] AROMATIC POLYSULFONE ETHER/POLYTHIOETHER SULFONE COPOLYMER AND PROCESS FOR ITS PREPARATION

[75] Inventors: Josho Kashiwame, Yamato; Yoshihiro Otsuka; Shigeyuki Kozawa, both of Yokohama, all of Japan

[73] Assignee: Asahi Glass Company, Ltd., Tokyo, Japan

[21] Appl. No.: 839,991

[22] Filed: Mar. 17, 1986

[51] Int. Cl.$^4$ .............................................. C08G 75/04
[52] U.S. Cl. ................................... 528/171; 525/534; 525/537; 528/174; 528/388; 528/391
[58] Field of Search ............... 528/391, 171, 174, 388; 525/534, 537

[56] References Cited

U.S. PATENT DOCUMENTS

4,301,274 11/1981 Campbell ............................ 528/391
4,307,222 12/1981 Schwab et al. ..................... 528/174

*Primary Examiner*—Melvyn I. Marquis
*Attorney, Agent, or Firm*—Oblon, Fisher, Spivak, McClelland & Maier

[57] ABSTRACT

An aromatic polysulfone ether/polythioether sulfone copolymer having the formula:

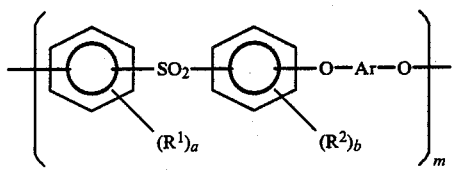

(I)

-continued

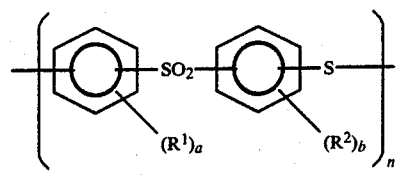

wherein each of $R^1$ and $R^2$ which may be the same or different, is hydrogen, halogen or a hydrocarbon group having from 1 to 8 carbon atoms, each of a and b which may be the same or different, is an integer of from 0 to 4, Ar is a bivalent aromatic residue selected from the group consisting of:

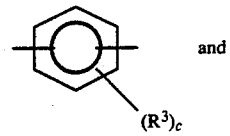

and

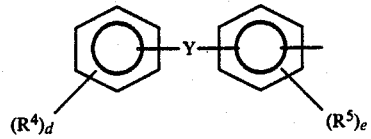

wherein each of $R^3$, $R^4$ and $R^5$ which may be the same or different, is hydrogen, or a hydrocarbon group having from 1 to 8 carbon atoms, each of c to e which may be the same of different, is an integer of from 0 to 4, Y is a single bond, —O—, —S—, —SO—, —SO$_2$—,

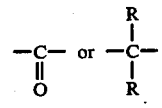

wherein R is hydrogen or a hydrocarbon group having from 1 to 6 carbon atoms, and each of m and n is an integer indicating the degree of polymerization and m:n is from 1:20 to 20:1, said copolymer having an inherent viscosity $\eta_{inh}$ of from 0.1 to 1.5 as measured at 30° C. with respect to its solution having a concentration of 0.5 g/dl in a solvent mixture of phenol/1,1,2,2-tetrachloroethane (3/2 by weight ratio).

9 Claims, 6 Drawing Figures

AROMATIC POLYSULFONE ETHER/POLYTHIOETHER SULFONE COPOLYMER AND PROCESS FOR ITS PREPARATION

The present invention relates to an aromatic polysulfone ether/polythioether sulfone copolymer as a novel heat resistant resin obtained by reacting a dihalodiphenyl sulfone with a diphenol and an alkali metal sulfide, and a process for producing such a copolymer.

Aromatic polysulfones are well known, and disclosed, for instance, by R. N. Johnson et al. in J. Polym. Sci., A-1 5 2375 (1967). Such aromatic polysulfones are obtainable as linear aromatic polysulfone polymers by reacting a di-alkali metal salt of a diphenol with an activated aromatic dihalide. The aromatic polysulfone polymers are thermoplastic resins having excellent mechanical properties at high temperatures and good chemical resistance and electric characteristics, and some of them are being practically used for electric or electronic parts, aircraft parts, automobile parts, food processing machine parts, parts of medical appliances, etc.

On the other hand, Japanese Unexamined Patent Publication No. 13347/1972 discloses that an aromatic polythioether sulfone is obtainable by the self-condensation of an alkali metal salt of a thiophenol having an activated halogen atom. Further, Japanese Examined Patent Publication No. 25880/1978 discloses that an aromatic polythioether sulfone is obtainable by a reaction of a dihalo-aromatic sulfone with an alkali metal sulfide, and Japanese Examined Patent Publication No. 25879/1978 discloses that an aromatic polythioether sulfone having a higher molecular weight can be obtained by an addition of an alkali metal carboxylate. It is also disclosed that these polymers have excellent high temperature properties and moldability.

Aromatic polysulfone polymers have excellent mechanical properties at high temperatures, as mentioned above. However, their mold flowability during the molding operation is not necessarily adequate, and they are not suitable for precision molding where a high level of mold flowability is required. Therefore, they have not yet been employed for such precision molding. Particularly when the amount of an additive is increased for the purpose of improving the mechanical properties or other properties of the molded product, or of reducing the costs, the melt viscosity increases accordingly, and when the amount of the additive reaches a certain level, it becomes difficult to conduct melt blending or melt molding.

On the other hand, aromatic polythioether sulfone polymers have excellent high temperature properties and moldability. However, their mechanical properties, particularly the impact strength, are not adequate, and the applications of molded products thereof are restricted because of this drawback.

The present inventors have conducted various studies and researches to overcome the above drawbacks on the recognition that it is necessary for the expansion of the field of the applications to improve the mold flowability of the aromatic polysulfone polymers without impairing their heat resistance and mechanical properties and to improve the mechanical properties of the aromatic polythioether sulfone polymers. As a result, it has been found that an aromatic polythioether polymer not only has excellent heat resistance like the aromatic polysulfone polymer but also provides excellent mold flowability for the improvement of the mold flowability of the aromatic polysulfone polymer, and it is possible to obtain a novel aromatic polysulfone ether/polythioether sulfone copolymer by the copolymerization of the two materials, and a process for the preparation of the copolymer having a high molecular weight.

The present invention provides an aromatic polysulfone ether/polythioether sulfone copolymer having the formula:

(I)

wherein each of $R^1$ and $R^2$ which may be the same or different, is hydrogen, halogen or a hydrocarbon group having from 1 to 8 carbon atoms, each of a and b which may be the same or different, is an integer of from 0 to 4, Ar is a bivalent aromatic residue selected from the group consisting of:

and wherein each of $R^3$, $R^4$ and $R^5$ which may be the same or different, is hydrogen, or a hydrocarbon group having from 1 to 8 carbon atoms, each of c to e which may be the same or different, is an integer of from 0 to 4, Y is a single bond, —O—, —S—, —SO—, —SO$_2$—, $$-\underset{\underset{O}{\|}}{C}- \text{ or } -\underset{\underset{R}{|}}{\overset{\overset{R}{|}}{C}}-$$

wherein R is hydrogen or a hydrocarbon group having from 1 to 6 carbon atoms, and each of m and n is an integer indicating the degree of polymerization and m:n is from 1:20 to 20:1, said copolymer having an inherent viscosity $\eta_{inh}$ of from 0.1 to 1.5 as measured at 30° C. with respect to its solution having a concentration of 0.5 g/dl in a solvent mixture of phenol/1,1,2,2-tetrachloroethane (3/2 by weight ratio).

The present invention also provides a process for producing the aromatic polysulfone ether/polythioether sulfone copolymer of the formula I, which comprises reacting a dihalodiphenyl sulfone having the formula:

(II)

wherein X is halogen at the ortho- or para-position to the sulfone group, and $R^1$, $R^2$, a and b are as defined above, with a diphenol having the formula:

(III)

wherein Ar is as defined above, and an alkali metal sulfide in a solvent in the presence of an alkali metal hydroxide or carbonate.

Now, the present invention will be described in detail with reference to the preferred embodiments.

In the accompanying drawings.

In the aromatic polysulfone ether/polythioether sulfone copolymer of the formula I of the present invention, the ratio of the aromatic polysulfone ether to the aromatic polythioether sulfone satisfies m:n=1:20 to 20:1, where each of m and n indicates the degree of polymerization in the formula I. In view of the properties and the moldability of the copolymer, m:n is preferably from 1:10 to 15:1, more preferably from 1:4 to 10:1. The degree of polymerization as the aromatic polysulfone ether/polythioether sulfone copolymer is such that the inherent viscosity $\eta_{inh}$ is from 0.1 to 1.5, preferably from 0.1 to 1.3, more preferably from 0.1 to 1.0 as measured at 30° C. with respect to its solution having a concentration of 0.5 g/dl in a solvent mixture of phenol/1,1,2,2-tetrachloroethane (3/2 by weight ratio).

In the present invention, the aromatic polysulfone ether/polythioether sulfone copolymer of the formula I can be a variety of copolymers represented by the formula I by suitably selecting the types of the starting materials i.e. the dihalodiphenyl sulfone of the formula II, the diphenol of the formula III and the alkali metal sulfide, used for the process for its preparation.

The dihalodiphenyl sulfone of the formula II used for the process for producing the aromatic polysulfone ether/polythioether sulfone copolymer of the formula I of the present invention, includes, for instance, bis(4-chlorophenyl)sulfone, bis(4-fluorophenyl)sulfone, bis(4-bromophenyl)sulfone, bis(4-iodophenyl)sulfone, bis(2-chlorophenyl)sulfone, bis(2-fluorophenyl)sulfone, bis(2-methyl-4-chlorophenyl)sulfone, bis(3,5-dimethyl-4-chlorophenyl)sulfone, bis(3,5-dimethyl-4-fluorophenyl)sulfone and bis(2,3,5,6-tetramethyl-4-chlorophenyl)sulfone. The halogen is located at the ortho- or para-position relative to the sulfone group. Such dihalophenyl sulfones may be used alone or in combination as a mixture of two or more different types. Among these dihalophenyl sulfones, particularly preferred are bis(4-chlorophenyl)sulfone and bis(4-fluorophenyl)sulfone.

The diphenol of the formula III used for the process for producing the aromatic polysulfone ether/polythioether sulfone copolymer, includes, for instance, hydroquinone, 1,5-dihydroxynaphthalene, 1,6-dihydroxynaphthalene, 1,7-dihydroxynaphthalene, 2,7-dihydroxynaphthalene, 4,4'-diphenol, 2,2'-diphenol, bis(4-hydroxyphenyl)ether, bis(2-hydroxyphenyl)ether, 2,2-bis(4-hydroxyphenyl)propane, 2,2-bis(3-methyl-4-hydroxyphenyl)propane, 2,2-bis(3,5-dimethyl-4-hydroxyphenyl)propane, bis(4-hydroxyphenyl)methane, bis(4-hydroxyphenyl)sulfide, bis(4-hydroxyphenyl)sulfoxide, 2,2-bis(3,5-dimethyl-4-hydroxyphenyl)sulfide, bis(4-hydroxyphenyl)sulfone, bis(3,5-dimethyl-4-hydroxyphenyl)sulfone, bis(4-hydroxyphenyl)ketone, 2,2-bis(4-hydroxyphenyl)hexafluoropropane and 1,1-bis(4-hydroxyphenyl)ethane. These may be used alone or in combination as a mixture of two or more different types. Among these diphenols, particularly preferred are hydroquinone, 4,4'-diphenol, 2,2-bis(4-hydroxyphenyl)propane, bis(4-hydroxyphenyl)sulfone and bis(4-hydroxyphenyl)ketone. Such a diphenol is used preferably in the form of an alkali metal salt. In order to let such a salt form prior to the polymerization reaction or during the polymerization reaction, an alkali metal salt is added to the reaction system. As such an alkali metal salt, a hydroxide, a carbonate or hydrogen carbonate of lithium, sodium, potassium or rubidium may be employed. Particularly preferred are sodium hydroxide, sodium carbonate, potassium hydroxide and potassium carbonate. The diphenol may be employed as separately prepared in the form of an alkali metal salt.

The alkali metal sulfide used together with the dihalophenyl sulfone and the diphenol in the process for the production of the polysulfone ether/polythioether sulfone copolymer of the present invention is a sulfide of lithium, sodium, potassium or rubidium. Particularly preferred is sodium sulfide. The alkali metal sulfide may be in the form of an anhydride or a hydrate having water of hydration. Further, it may be a mixture of an alkali metal hydroxide and an alkali metal hydrosulfide.

The solvent used for the polymerization reaction in the process for the production of the polysulfone ether/polythioether sulfone copolymer of the present invention, is preferably a compound which is commonly referred to as a polar solvent. However, the solvent is not restricted to such a polar solvent. As typical examples of the solvent, there may be mentioned dimethylsulfoxide, sulforan, N-methyl-2-pyrrolidone, 1,3-dimethyl-2-imidazolidinone and N,N-dimethylformamide.

With respect to the moalr ratio of the reactants to be used for the process of the present invention, the molar ratio of the dihalodiphenyl sulfone to the total amount of the diphenol and the alkali metal sulfide is preferably within a range of from 0.7 to 1.3, more preferably from 0.85 to 1.15. In order to obtain a polymer having a high molecular weight, it is desired to adjust the molar ratio close to 1. The molar ratio of the diphenol to the alkali metal sulfide may be varied depending upon the desired composition of the copolymer.

The amount of the above-mentioned solvent to be used for the process of the present invention, is preferably within a range of from 0.05 to 20 times, more preferably from 0.1 to 10 times, based on the weight of the dihalodiphenyl sulfone to be used. The polymerization reaction of the reactants may proceed even without using a solvent, but it is preferred to employ a solvent of the above-mentioned type.

The polymerization reaction in the process for the production of the aromatic polysulfone ether/polythioether sulfone copolymer of the present invention, can be conducted by employing various processes as shown below.

Various processes may be classified generally into a direct reaction method and a two step reaction method. The two step reaction method is preferred in that a copolymer having a higher molecular weight can thereby be obtained.

In the direct reaction method, the diphenol is reacted with the alkali metal hydroxide or carbonate in a polar solvent, and then the alkali metal sulfide and the dihalodiphenyl sulfone are added to the reaction system and reacted. In such a reaction, instead of the diphenol and the alkali metal hydroxide or carbonate, an anhydride of the di-alkali metal salt of the diphenol separately prepared, may be employed. Otherwise, it is possible to employ an aqueous solution obtained by reacting the diphenol with an alkali metal salt compound in the reaction system prior to the polymerization, or a concentrate of such an aqueous solution. When such an aqueous solution or its concentrate is to be used, it is preferred to remove water prior to the polymerization or during the polymerization by an addition of azeotropic solvent until it becomes substantially anhydrous. In a case where an alkali metal sulfide is employed in the reaction system in the form of a hydrate or in the form of an aqueous solution, such a water removal step is conducted preferably after the addition of the alkali metal sulfide. An inert organic solvent may be employed as the azeotropic solvent for this purpose. For instance, benzene, toluene, xylene, chlorobenzene or o-dichlorobenzene may be mentioned as a suitable solvent. However, the azeotropic solvent should be the one having a boiling point lower than that of the solvent for the reaction.

The temperature for the polymerization reaction may vary depending upon the types of the starting materials for the reaction, the type of the polymerization reaction, etc. However, it is usually within a range of from 50° to 400° C., preferably from 100° to 300° C. The reaction time varies depending upon the reaction temperature. If the temperature is low, it takes a long time for the completion of the reaction. When the temperature is high, the reaction is completed in a short period of time. Usually, the reaction time is within a range of from 10 minutes to 100 hours, preferably from 30 minutes to 24 hours.

After the completion of the polymerization reaction, the polymer is separated and purified in accordance with a conventional method for aromatic ether polysulfone polymers. For instance, after filtering off the alkali metal halide as a by-product, the polymer is dropwise added to a non-solvent, whereupon the polymer will precipitate.

As the two step reaction method, the following three types of reactions may be employed.

In the first type, the dihalodiphenyl sulfone of the formula II and the di-alkali metal salt of the diphenol of the formula III, are reacted first to obtain a precursor of a aromatic polysulfone ether having the formula:

wherein $R^1$, $R^2$, a, b, Ar and m are as defined above, and then the precursor is reacted with the alkali metal sulfide and the dihalodiphenyl sulfone of the formula II to obtain a copolymer of the formula I.

The second type is the reversal of the reaction mode of the first process. Namely, the dihalodiphenyl sulfone of the formula II and the alkali metal sulfide are reacted first to obtain a precursor of an aromatic polythioether sulfone having the formula:

wherein $R^1$, $R^2$, a, b and n are as defined above, and then the precursor is reacted with the diphenol of the formula III and the dihalophenyl sulfone of the formula II to obtain a copolymer of the formula I.

The third type is a process wherein a precursor of an aromatic polysulfone ether of the formula IV and a precursor of an aromatic polythioether sulfone of the formula V are preliminarily separately prepared, and then the two precursors are reacted to obtain a copolymer of the formula I.

With respect to the molar ratio of the reactants for the preparation of the precursor of an aromatic polysulfone ether of the formula IV or the precursor of an aromatic polythioether sulfone of the formula V to be used in the two step reaction method, the molar ratio of the diphenol or the alkali metal sulfide to the dihalodiphenyl sulfone is preferably within a range of from 0.5 to 1.5, more preferably from 0.8 to 1.2. If the molar ratio is less than 0.5 or more than 1.5, respectively, the molecular weight of the precursor tends to be too low, whereby the resulting copolymer will have a low molecular weight or poor physical properties.

With respect to the molar ratio for the polymerization of the second step to obtain the copolymer, it is preferred that the molar ratio of the total amounts of the diphenol and the alkali metal sulfide used for the preparation of the precursor and for the polymerization of the second step to the total amount of the dihalodiphenyl sulfone is within the range of 0.7 to 1.3, more preferably from 0.85 to 1.15. Especially, in order to obtain a polymer having a high molecular weight, it is desirable that the molar ratio is close to 1.

The molar ratio of the diphenol to the alkali metal sulfide may be varied depending upon the desired composition of the copolymer.

According to the two step reaction method, the copolymer can be prepared either from the aromatic polysulfone ether precursor or from the aromatic polythioether sulfone precursor. In each case, the reaction is conducted in a manner similar to the direct reaction method.

Namely, in the case of the reaction of the di-alkali metal salt of the diphenol with the dihalodiphenyl sulfone, it is possible to react the diphenol in the presence of an alkali metal hydroxide or carbonate. Further, it is preferred to maintain the reaction system in a substantially anhydrous condition.

On the other hand, in the case of the reaction of the alkali metal sulfide with the dihalodiphenyl sulfone, it is preferred that a proper amount of water is present in the reaction system. The amount of water is preferably from 0.5 to 7 mols per mol of the alkali metal sulfide. If the amount is less or more than this range, it becomes difficult to obtain a polymer having a high molecular weight. Therefore, if an anhydrous alkali meal sulfide is used, water is added in an amount within the above range. Likewise, when the alkali metal sulfide in the form of a hydrate or in the form of an aqueous solution, it is necessary to either add water or remove water by an addition of the above-mentioned azeotropic solvent to bring the water content within the above range.

Further, it is possible to increase the molecular weight of the resulting polymer by adding an alkali metal carboxylate such as lithium acetate or lithium benzoate during this reaction. The alkali metal carboxylate is used preferably in an amount of from 0.5 to 2 mols per mol of the alkali metal sulfide.

The reaction temperature, the reaction time and the conditions for the separation and purification of the polymer after the completion of the reaction in the two step reaction method may be similar to those in the direct reaction method.

The aromatic polysulfone ether/polythioether sulfone copolymer of the present invention thus obtained, is a novel thermoplastic resin having excellent heat resistance, and yet it is excellent in the mechanical and electrical properties. Especially, it may contain various inorganic or organic fillers at a high density. Accordingly, in the form of a resin composition, it may be molded into any desired shape by a usual molding method such as compression molding, extrusion molding or injection molding. The molded products obtained by such a method can be applied to precision parts such as electric or electronic parts or automobile parts where heat resistance is required, to which the application of the conventional resin compositions has been restricted because of the inadequate mold flowability.

Now, the present invention will be described in further detail with reference to Examples. However, it should be understood that the present invention is by no means restricted by these specific Examples.

EXAMPLE 1

Figure 1:
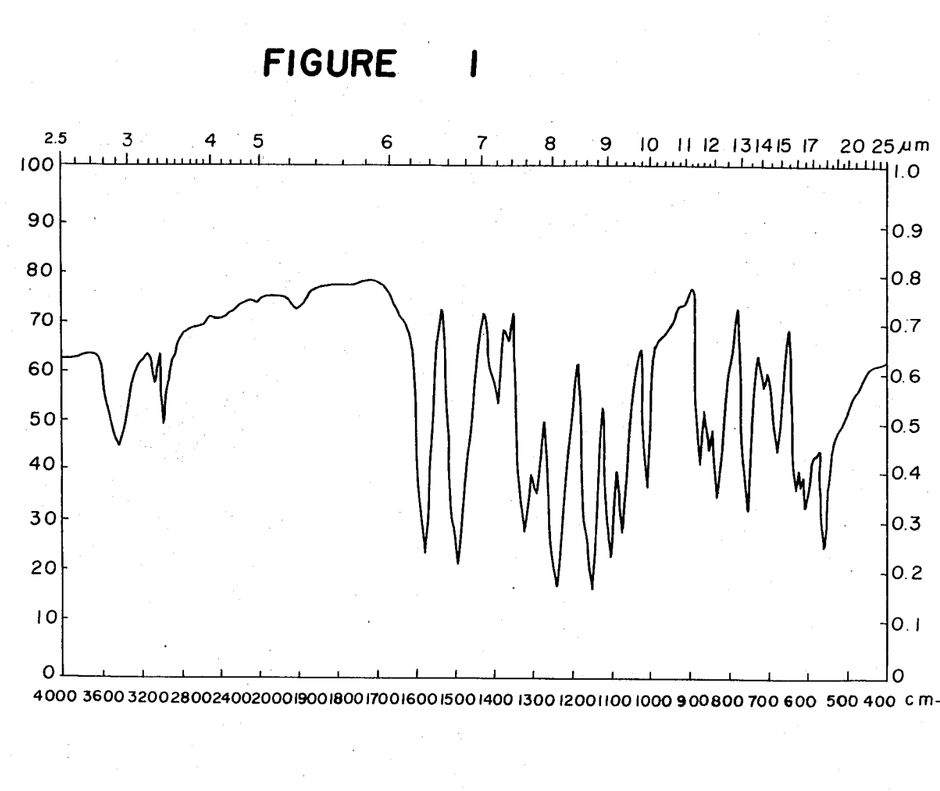
FIG. 1 is an IR spectrum chart of the copolymer prepared in Example 1 of the present invention.
Figure 2:
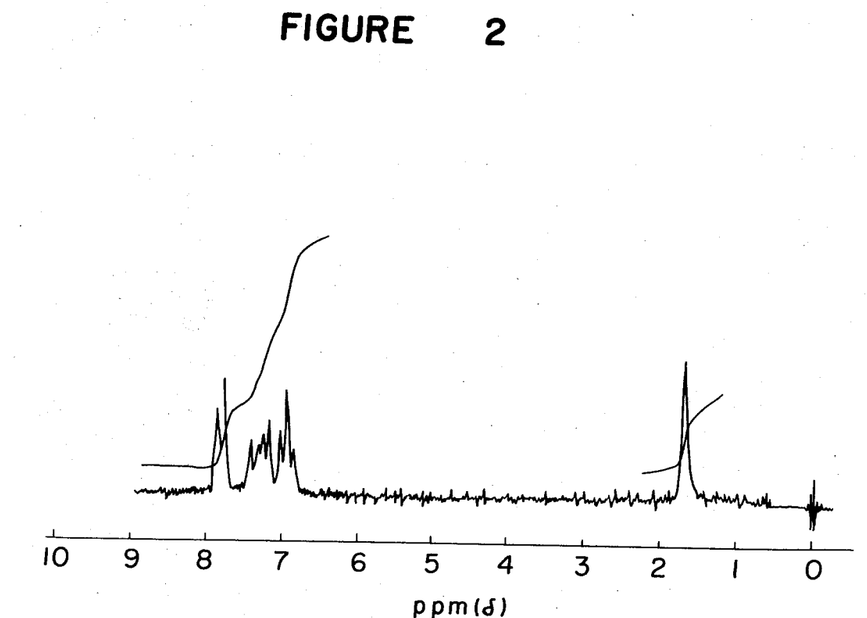
FIG. 2 is a NMR spectrum chart of the same copolymer.
Figure 3:
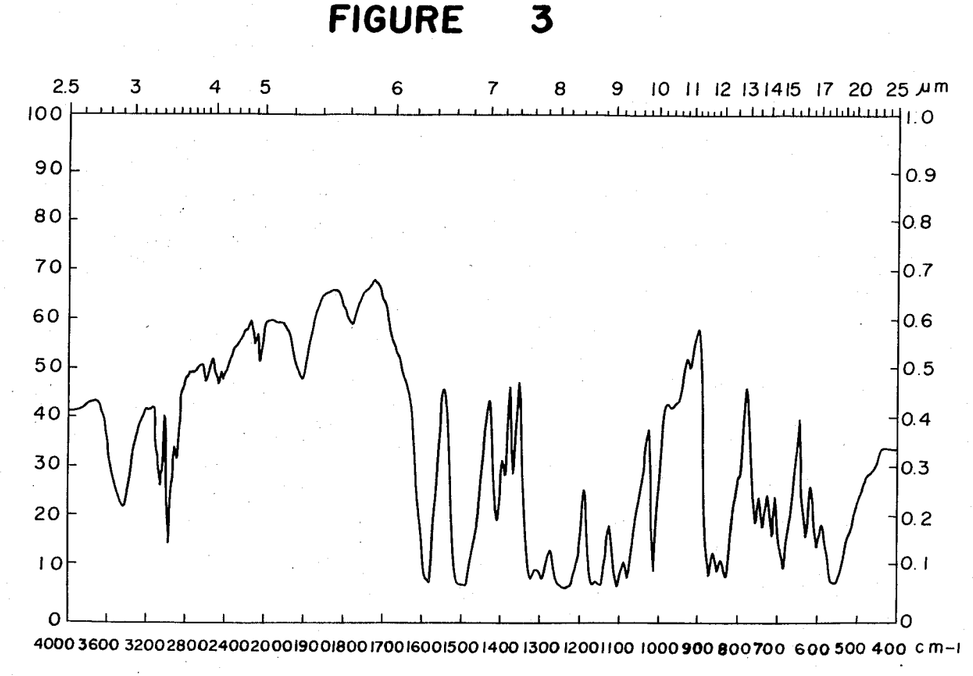
FIGS. 3 and 4 are an IR spectrum chart and a NMR spectrum chart, respectively, of the copolymer prepared in Example 16.
Figure 4:
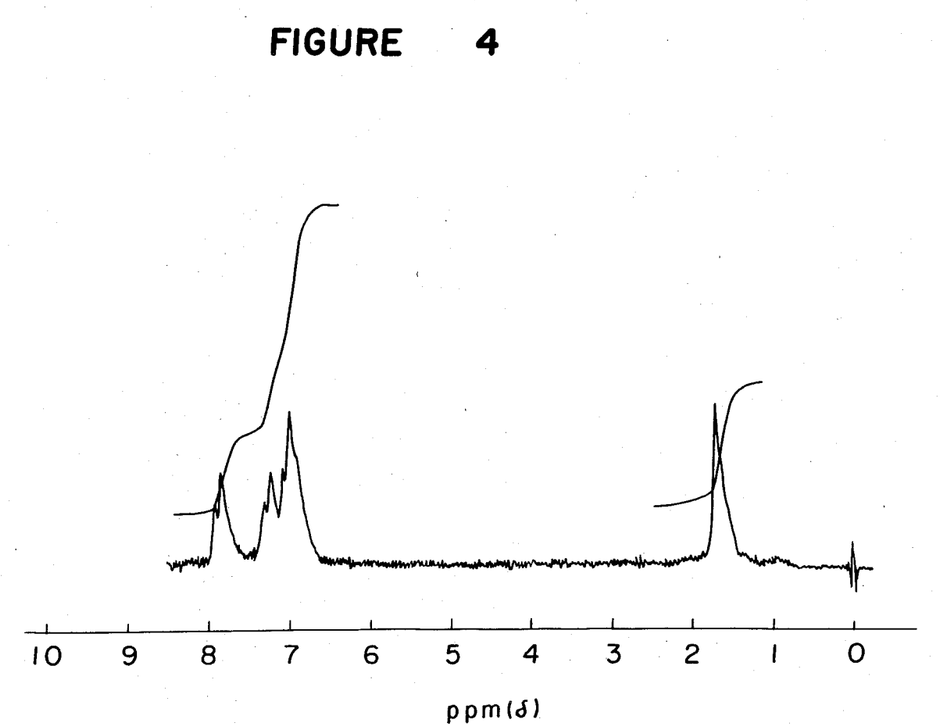
Figure 5:
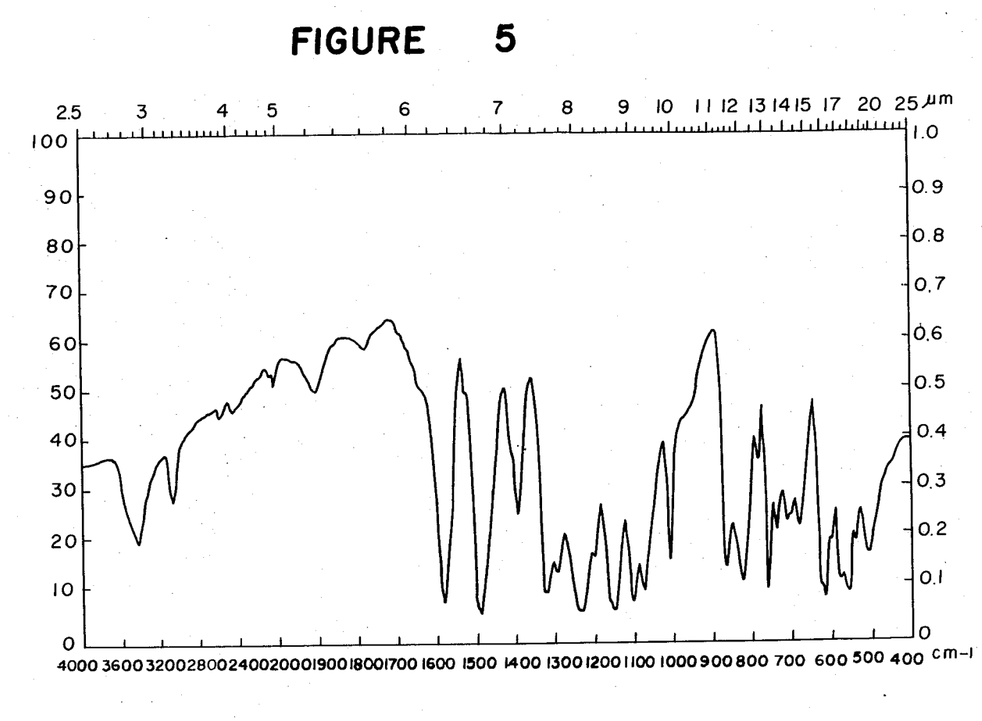
FIGS. 5 and 6 are an IR spectrum chart and a NMR spectrum chart, respectively, of the copolymer prepared in Example 17.
Figure 6:
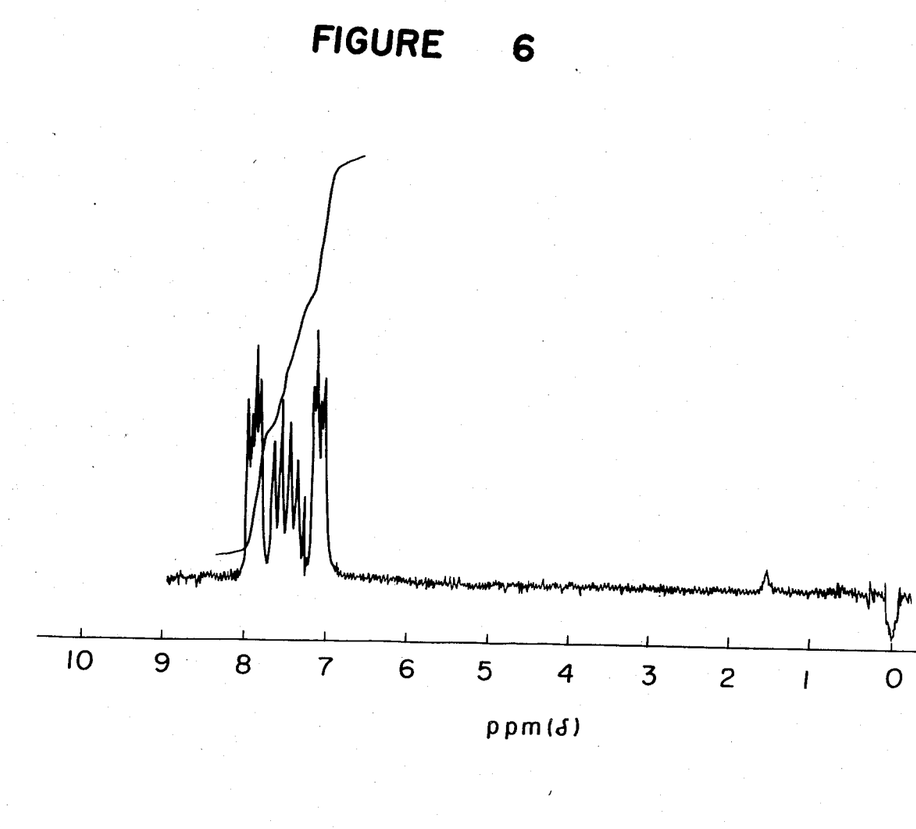

Into a reactor having an internal capacity of 100 ml, 1.141 g (5 mmol) of bisphenol A, 0.835 g of an aqueous sodium hydroxide solution (48.40% by weight) and 5 ml of N-methyl-2-pyrrolidone were charged. After flushing the air in the reaction system with nitrogen, the mixture was heated to 150° C. under stirring and maintained at that temperature for 10 minutes. Then, the reaction mixture was cooled to a temperature below 100° C., and 0.647 g (5 mmol) of sodium sulfide (purity: 60%) and 20 ml of chlorobenzene were added. The mixture was heated again, and water present in the reaction mixture was continuously removed as an azeotrope with chlorobenzene. Further, chlorobenzene was thoroughly distilled off, and the reaction mixture was heated to 150° C. for 10 minutes. Then, the reaction mixture was cooled, and 2.872 g (10 mmol) of 4,4'-dichlorodiphenyl sulfone and 5 ml of N-methyl-2-pyrrolidone were added thereto. After thoroughly flushing the inside of the reaction system with nitrogen, the mixture was heated to 150° C. and reacted for 14 hours. The reaction product thus obtained was poured into a large amount of methanol, whereby a white polymer precipitated. The polymer was collected by filtration, then washed twice with methanol and twice with hot water and dried under reduced pressure at 100° C. for 5 hours. The polymer thus obtained was 3.23 g. It was diluted with phenol/tetrachloroethane=3/2 (weight ratio) to a concentration of 0.5 g/dl, and the inherent viscosity was measured at 30° C. and found to be 0.20. The IR spectrum of this polymer is shown in FIG. 1, and the NMR spectrum is shown in FIG. 2. From FIGS. 1 and 2, the polymer obtained was confirmed to be a copolymer having units. m:n=1:1.

EXAMPLE 2

Into a reactor having an internal capacity of 100 ml, 1.027 g (4.5 mmol) of bisphenol A, 0.76 g of an aqueous sodium hydroxide solution (48.40% by weight) and 2.5 ml of N-methyl-2-pyrrolidone were charged. After flushing the air in the reaction system with nitrogen, the mixture was heated to 150° C. under stirring and maintained at that temperature for 10 minutes. Then, the reaction solution was cooled below 100° C., and 0.065 g (0.5 mmol) of sodium sulfide (purity: 60%), 1.436 g (5 mmol) of 4,4'-dichlorodiphenyl sulfone and 2.5 ml of N-methyl-2-pyrrolidone were added thereto. The mixture was heated again to 150° C. and reacted for 14 hours. The reaction mixture thus obtained was poured into a large amount of methanol, whereby a white polymer precipitated. This polymer was collected by filtration, then washed twice with methanol and twice with hot water and dried under reduced pressure at 100° C. for 5 hours to obtain 1.85 g of a polymer. The polymer thus obtained was diluted with phenol/tetrachloroethane=3/2 (weight ratio) to a concentration of 0.5 g/dl, and the inherent viscosity was measured at 30° C. and found to be 0.15. m:n=9:1.

EXAMPLE 3

Into a 200 ml autoclave, 7.778 g (0.06 mol) of sodium sulfide (purity: about 60%), 18.953 g (0.066 mol) of 4,4'-dichlorodiphenyl sulfone (hereinafter referred to as "DCDPS"), 3.959 g (0.06 mol) of anhydrous lithium acetate and 40 ml of N-methyl-2-pyrrolidone (hereinafter referred to as "NMP") were charged. After pressurizing the autoclave to a pressure of 5 kg/cm² with nitrogen gas, the reaction mixture was reacted at 160° C. for 3 hours. After cooling the reaction mixture, 60 ml of toluene was added thereto, and while supplying nitrogen, the reaction mixture was heated again to azeotropically distill off water together with toluene from the reaction mixture. The temperature was raised to 160° C. and toluene was thoroughly distilled off. When toluene was no longer distilled, the reaction mixture was cooled, and 16.336 g (0.06 mol) of an anhydrous disodium salt of bisphenol A prepared separately, 15.507 g (0.054 mol) of DCCPS and 40 ml of NMP were charged. The mixture was reacted in a nitrogen atmosphere at 160° C. for 3 hours. The reaction was terminated with methane chloride, and the reaction mixture was cooled and poured into a large amount of water, whereby a polymer precipitated. The polymer was washed three times with hot water and once with methanol and dried under reduced pressure at 150° C. for 5 hours. The polymer thus obtained was 41.21 g (yield: 99%) and from the IR and NMR spectra, it was found to have the following structure.

ture was heated to continuously remove water from the reaction mixture as an azeotrope with toluene. Further, the mixture was heated to 160° C. to thoroughly distill off toluene. When toluene was no longer distilled, the reaction mixture was cooled, and 15.507 g (0.054 mol) of DCDPS was added. The reaction mixture was reacted in a nitrogen atmosphere at 160° C. for 3 hours. After cooling, 7.778 g (0.06 mol) of sodium sulfide (purity: about 60%), 18.953 g (0.066 mol) of DCDPS, 3.959 g (0.06 mol) of anhydrous lithium acetate and 40 ml of NMP were added. After pressurizing the autoclave to a pressure of 5 kg/cm$^2$ with nitrogen gas, the reaction This polymer was diluted with phenol/1,1,2,2-tetrachloroethane=3/2 (weight ratio) to a concentration of 0.5 g/dl, and the inherent viscosity was measured at 30° C. and found to be 0.45. The glass transition temperature ($T_g$) of this polymer was measured by DTA and found to be 187° C. m:n=1:1.

EXAMPLES 4 TO 11

Polymers were obtained in the same manner as in Example 3 except that the monomer and the molar ratio were changed as identified in Table 1. The results are shown in Table 1.

mixture was reacted at 160° C. for 3 hours. The reaction was terminated with methane chloride, and the subsequent operation was conducted in the same manner as in Example 3 to obtain a polymer. The polymer thus obtained was 41.15 g (yield: 99%) and from the IR and NMR spectra, it was found to have the same structure as the polymer obtained in Example 3. Further, the inherent viscosity was found to be 0.45, and $T_g$ was 188° C. m:n=1:1.

EXAMPLES 13 TO 20

Polymers were obtained in the same manner as in

TABLE 1

| | First step polymerization | | Second step polymerization | | | | Lithium acetate (mol) | Yield (%) | Inherent viscosity | $T_g$ (°C.) | m:n |
|---|---|---|---|---|---|---|---|---|---|---|---|
| | Na$_2$S (mol) | Dihalodiphenyl sulfone (mol) | Di-alkali metal salt of diphenol (mol) | | Dihalodiphenyl sulfone (mol) | | | | | | |
| Example 4 | (0.06) | DCDPS (0.072) | Di-sodium salt of bisphenol A | (0.06) | DCDPS | (0.048) | 0.06 | 98 | 0.36 | 183 | 1:1 |
| Example 5 | (0.06) | DCDPS (0.054) | Di-sodium salt of bisphenol A | (0.06) | DCDPS | (0.066) | Nil | 98 | 0.40 | 187 | 1:1 |
| Example 6 | (0.08) | DCDPS (0.084) | Di-sodium salt of bisphenol A | (0.04) | DCDPS | (0.036) | Nil | 97 | 0.42 | 195 | 1:2 |
| Example 7 | (0.04) | DCDPS (0.032) | Di-sodium salt of bisphenol A | (0.08) | DCDPS | (0.088) | Nil | 99 | 0.50 | 183 | 2:1 |
| Example 8 | (0.06) | DCDPS (0.054) | Di-potassium salt of bisphenol A | (0.06) | DCDPS | (0.066) | (0.06) | 99 | 0.38 | 180 | 1:1 |
| Example 9 | (0.06) | DCDPS (0.066) | Di-potassium salt of 4,4'-diphenol | (0.06) | DCDPS | (0.054) | (0.06) | 98 | 0.59 | 214 | 1:1 |
| Example 10 | (0.06) | DCDPS (0.066) | Di-potassium salt of hydroquinone | (0.06) | DCDPS | (0.054) | (0.06) | 99 | 0.48 | 201 | 1:1 |
| Example 11 | (0.06) | 4,4'-Difluorodiphenyl sulfone (0.048) | Di-sodium salt of bisphenol A | (0.06) | 4,4'-Difluorodiphenyl sulfone | (0.072) | Nil | 99 | 0.61 | 188 | 1:1 |

In Examples 9 and 10, the reaction temperature was 200° C.

EXAMPLE 12

Into a 200 ml autoclave, 13.697 g (0.06 mol) of bisphenol A, 9.93 g of an aqueous sodium hydroxide solution (48.8% by weight), 40 ml of NMP and 80 ml of toluene were charged. While supplying nitrogen gas, the mixture was heated to continuously Example 10 except that the monomer and the molar ratio were changed as identified in Table 2. The results are shown in Table 2. The IR and NMR spectrum charts of the polymers obtained in Examples 16 and 17 are shown in FIGS. 3 to 6.

TABLE 2

| | First step polymerization | | | | | |
|---|---|---|---|---|---|---|
| | Diphenol (mol) | | Dihalodiphenyl sulfone (mol) | | Alkali metal salt (mol) | |
| Example 13 | Bisphenol A | (0.06) | DCDPS | (0.066) | Sodium hydroxide | (0.12) |
| Example 14 | Bisphenol A | (0.04) | DCDPS | (0.044) | Sodium hydroxide | (0.08) |
| Example 15 | Bisphenol A | (0.08) | DCDPS | (0.072) | Sodium hydroxide | (0.16) |
| Example 16 | Bisphenol A | (0.109) | DCDPS | (0.1199) | Potassium carbonate | (0.1417) |
| Example 17 | 4,4'-Diphenol | (0.06) | DCDPS | (0.066) | Potassium carbonate | (0.078) |
| Example 18 | Hydroquinone | (0.06) | 4,4'-Difluorodiphenyl sulfone | (0.066) | Potassium carbonate | (0.078) |
| Example 19 | Bis(4-hydroxy- | (0.06) | DCDPS | (0.066) | Potassium carbonate | (0.078) |

TABLE 2-continued

| Example 20 | phenyl)ketone Bis(4-hydroxy-phenyl)sulfone | (0.06) | DCDPS | (0.066) | Potassium carbonate | (0.078) |
|---|---|---|---|---|---|---|

| | Second step polymerization | | | Lithium | | | | |
|---|---|---|---|---|---|---|---|---|
| | Na₂S (mol) | Dihalodiphenyl sulfone (mol) | | acetate (mol) | Yield (%) | Inherent viscosity | $T_g$ (°C.) | m:n |
| Example 13 | (0.06) | DCDPS | (0.054) | Nil | 99 | 0.51 | 189 | 1:1 |
| Example 14 | (0.08) | DCDPS | (0.076) | 0.08 | 98 | 0.44 | 199 | 1:2 |
| Example 15 | (0.04) | DCDPS | (0.048) | 0.04 | 99 | 0.60 | 185 | 2:1 |
| Example 16 | (0.0109) | Nil | | Nil | 99 | 0.65 | 181 | 10:1 |
| Example 17 | (0.06) | DCDPS | (0.054) | Nil | 100 | 0.59 | 214 | 1:1 |
| Example 18 | (0.06) | 4,4'-Difluorodiphenyl sulfone | (0.054) | Nil | 98 | 0.64 | 202 | 1:1 |
| Example 19 | (0.06) | DCDPS | (0.054) | Nil | 98 | 0.23 | 194 | 1:1 |
| Example 20 | (0.06) | DCDPS | (0.054) | Nil | 99 | 0.42 | 211 | 1:1 |

In Examples 16 to 20, the reaction temperature was 200° C.

EXAMPLE 21

In this Example, an aromatic polysulfone ether precursor and an aromatic polythioether sulfone precursor were separately prepared, and then the synthesis of the copolymer was conducted.

Preparation of an aromatic polysulfone ether precursor

Into a reactor having an internal capacity of 200 ml, 15.016 g (0.06 mol) of 4,4'-dihydroxydiphenyl sulfone, 18.953 g (0.066 mol) of DCDPS, 10.78 g (0.078 mol) of potassium carbonate, 40 ml of NMP and 80 ml of toluene were charged. While supplying nitrogen, the mixture was heated, and water in the reaction mixture was distilled off from the system together with toluene. When water was no longer distilled, the temperature was raised to 180° C., and the remaining toluene was thoroughly distilled off. Then, the reaction was conducted at 200° C. for 3 hours to obtain an aromatic polysulfone ether precursor mixture.

Preparation of an aromatic polythioether sulfone precursor

Into a 200 ml autoclave, 7.778 g (0.06 mol) of sodium sulfide (purity: about 60%), 15.507 g (0.054 mol) of DCDPS, 3.959 g (0.06 mol) of anhydrous lithium acetate and 40 ml of NMP were charged, and pressurized to 5 kg/cm² with nitrogen. The reaction mixture was reacted at 200° C. for 3 hours to obtain an aromatic polythioether sulfone precursor mixture.

Synthesis of a copolymer

Into the above aromatic polythioether sulfone precursor mixture, the previously prepared aromatic polysulfone ether precursor mixture was added. The mixture was reacted under a nitrogen gas pressure of 5 kg/cm² at 200° C. for 2 hours. The reaction was terminated with methane chloride, and the subsequent operation was conducted in the same manner as the previous Examples to obtain a polymer. The polymer thus obtained was 42.40 g (yield: 99%) and from the IR and NMR spectra, it was found to have the following structure.

This polymer had a inherent viscosity of 0.56 and $T_g$ of 209° C. m:n=1:1.

The aromatic polysulfone ether/polythioether sulfone copolymers of the present invention are novel thermoplastic resins having excellent heat resistance, and the process for their preparation has a merit that such copolymers having high molecular weights can thereby be produced in good yield.

The aromatic polysulfone ether/polythioether sulfone copolymers of the present invention can be molded by conventional molding methods, and they have a feature that the melt viscosity is low and thus the mold flowability is excellent and various inorganic or organic fillers can be incorporated at a high density. Thus, the copolymers of the present invention provide a remarkable advantage such that the field of applications as resin compositions will be expanded, and they can be applied to e.g. the field of precision molded products where heat resistance is required, to which the application of the conventional compositions has been restricted in view of inadequate flowability during the molding operation. Thus, the copolymers of the present invention provides remarkable advantages.

We claim:

1. An aromatic polysulfone ether/polythioether sulfone copolymer having the formula:

wherein each of $R^1$ and $R^2$ which may be the same or different, is hydrogen, halogen or a hydrocarbon group having from 1 to 8 carbon atoms, each of a and b which may be the same or different, is an integer of from 0 to 4, Ar is a bivalent aromatic residue selected from the group consisting of:

and wherein each of $R^3$, $R^4$ and $R^5$ which may be the same or different, is hydrogen, or a hydrocarbon group having from 1 to 8 carbon atoms, each of c to e which may be the same or different, is an integer of from 0 to 4, Y is a single bond, —O—, —S—, —SO—, —SO$_2$—, wherein R is hydrogen or a hydrocarbon group having from 1 to 6 carbon atoms, and each of m and n is an integer indicating the degree of polymerization and m:n is from 1:20 to 20:1, said copolymer having an inherent viscosity $\eta_{inh}$ of from 0.1 to 1.5 as measured at 30° C. with respect to its solution having a concentration of 0.5 g/dl in a solvent mixture of phenol/1,1,2,2-tetrachloroethane (3/2 by weight ratio).

2. The copolymer according to claim 1, wherein m:n is from 1:10 to 15:1.

3. The copolymer according to claim 1, wherein m:n is from 1:4 to 10:1.

4. The copolymer according to claim 1, wherein the inherent viscosity $\eta_{inh}$ is from 0.1 to 1.3.

5. The copolymer according to claim 1, wherein the inherent viscosity $\eta_{inh}$ is from 0.1 to 1.0.

6. A process for producing an aromatic polysulfone ether/polythioether sulfone copolymer having the formula:

(I)

wherein each of $R^1$ and $R^2$ which may be the same or different, is hydrogen, halogen or a hydrocarbon group having from 1 to 8 carbon atoms, each of a and b which may be the same or different, is an integer of from 0 to 4, Ar is a bivalent aromatic residue selected from the group consisting of:

and wherein each of $R^3$, $R^4$ and $R^5$ which may be the same or different, is hydrogen, or a hydrocarbon group having from 1 to 8 carbon atoms, each of c to e which may be the same or different, is an integer of from 0 to 4, Y is a single bond, —O—, —S—, —SO—, —SO$_2$—, wherein R is hydrogen or a hydrocarbon group having from 1 to 6 carbon atoms, and each of m and n is an integer indicating the degree of polymerization and m:n is from 1:20 to 20:1, which comprises reacting a dihalodiphenyl sulfone having the formula:

(II)

wherein X is halogen at the ortho- or para-position to the sulfone group, and $R^1$, $R^2$, a and b are as defined above, with a diphenol having the formula:

HO—Ar—OH (III)

wherein Ar is as defined above, and an alkali metal sulfide in a solvent in the presence of an alkali metal hydroxide or carbonate.

7. The process according to claim 6, wherein the dihalodiphenyl sulfone of the formula II and the diphenol of the formula III are reacted first to obtain a precursor having the formula:

(IV)

wherein $R^1$, $R^2$, a, b, Ar and m are as defined above, and then the precursor of the formula IV is reacted with the alkali metal sulfide and the dihalodiphenyl sulfone of the formula II.

8. The process according to claim 6, wherein the dihalodiphenyl sulfone of the formula II and the alkali metal sulfide are reacted first to obtain a precursor:

(V)

wherein $R^1$, $R^2$, a, b and n are as defined above, and then the precursor of the formula V is reacted with the diphenol of the formula III and the dihalophenyl sulfone of the formula II.

9. The process according to claim 6, wherein a precursor obtained by reacting the dihalophenyl sulfone of the formula II and the diphenol of the formula III, is reacted with a precursor obtained by reacting the dihalophenyl sulfone of the formula II and the alkali metal sulfide.

* * * * *